United States Patent
Nishikawa

(10) Patent No.: US 9,473,003 B2
(45) Date of Patent: Oct. 18, 2016

(54) ROTARY ELECTRIC MACHINE FOR VEHICLE

(71) Applicant: Mitsubishi Electric Corporation, Chiyoda-ku, Tokyo (JP)

(72) Inventor: Ken Nishikawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 318 days.

(21) Appl. No.: 14/337,436

(22) Filed: Jul. 22, 2014

(65) Prior Publication Data

US 2015/0303759 A1 Oct. 22, 2015

(30) Foreign Application Priority Data

Apr. 22, 2014 (JP) ................... 2014-087857

(51) Int. Cl.
*H02K 3/38* (2006.01)
*H02K 9/19* (2006.01)
*H02K 3/34* (2006.01)
*H02K 3/24* (2006.01)

(52) U.S. Cl.
CPC ........ *H02K 9/19* (2013.01); *H02K 3/24* (2013.01); *H02K 3/34* (2013.01)

(58) Field of Classification Search
CPC ............ H02K 3/18; H02K 3/24; H02K 3/28; H02K 3/34; H02K 3/38; H02K 3/522; H02K 7/20; H02K 9/19
See application file for complete search history.

(56) References Cited

U.S. PATENT DOCUMENTS

| 6,429,557 | B2 * | 8/2002 | Sheeran | H02K 5/225 310/270 |
|---|---|---|---|---|
| 6,993,829 | B2 * | 2/2006 | Kobayashi | H02K 15/0056 29/596 |
| 7,453,175 | B2 * | 11/2008 | Nakanishi | H02K 7/20 310/68 B |
| 7,723,878 | B2 * | 5/2010 | Yagai | H02K 3/522 310/71 |
| 2010/0052441 | A1 | 3/2010 | Fukushima | |
| 2011/0278974 | A1 * | 11/2011 | Matsuyama | H02K 3/522 310/71 |
| 2012/0098363 | A1 * | 4/2012 | Elser | H02K 3/522 310/71 |

FOREIGN PATENT DOCUMENTS

JP 2010-057261 A 3/2010

* cited by examiner

*Primary Examiner* — Tran Nguyen
(74) *Attorney, Agent, or Firm* — Sughrue Mion, PLLC; Richard C Turner

(57) ABSTRACT

A rotary electric machine for a vehicle is obtained in which cooling performance between phases of a coil can be improved. The rotary electric machine for a vehicle includes: a stator that is placed opposite the outer periphery face of a rotor and has a plurality of split cores; coil ends formed protruded toward the edge face in the axis direction of the cores on each of which a coil is wound; a power distribution part placed on the radial outer periphery side of the cores; and a cover for protecting the power distribution part, wherein the inner periphery of the cover is located more inside than the outermost periphery of the coil ends in the radial direction and has inclined parts inclined toward the coil ends.

6 Claims, 9 Drawing Sheets

ROTARY ELECTRIC MACHINE FOR VEHICLE

BACKGROUND OF THE INVENTION

1. Field of the Invention

The present invention relates to rotary electric, machines for a vehicle, and particularly relates to a rotary electric machine for a vehicle, having a structure for cooling a coil of a stator.

2. Description of the Related Art

For conventional rotary electric machines for a vehicle, in order to reduce temperature increase when a coil of a stator is energized, methods of directly discharging cooling oil to coil portion have been proposed. Among them, many implementations have been reported in which a hollow shaft or the like is used to splash cooling oil from the inside of a rotor toward coil end portions configured on both sides in the axis direction of a stator, thereby achieving cooling.

[Patent Document 1] JP-A-2010-57261

However, for a flat multipole motor in which concentrated winding is employed as a winding specification of the stator, indeed cooling oil splashed from the inside of the rotor onto the coil end portions can reduce temperature increase of the coil end portions, but the cooling oil is not directly splashed onto a middle portion in the axis direction between phases of the coil, providing less cooling effect to the middle portion than that to the coil end portions, causing the coil temperature to tend to increase. This may increase local heat deterioration of the coil.

In order to solve the problem, the Patent Document 1 has proposed a method of providing a nozzle on the upper portion of the coil ends to directly cool between phases of the coil ends. This method enables cooling between phases of a coil that is difficult to be cooled. However, this method requires configuration of parts in which many holes are provided on the upper portion of the stator, which raises a problem of increasing the number of parts and increasing the number of machining processes for providing passages.

SUMMARY OF THE INVENTION

In order to solve the above problem, it is an object of the present invention to provide a rotary electric machine for a vehicle in which cooling oil discharged from the inner periphery of a rotor can be captured and guided into a valley between coil ends to improve cooling performance between phases of a coil that tends to be heated.

Further, it is another object of the invention to provide a rotary electric machine for a vehicle in which a coil in a slot can be uniformly cooled to increase heat life of a stator.

The rotary electric machine for a vehicle in accordance with the invention includes: a stator that is placed opposite the outer periphery face of a rotor and has a plurality of split, cores; coil ends formed protruded toward the edge face in the axis direction of the cores on each of which a coil is wound; a power distribution part placed on the radial outer periphery side of the cores; and a cover for protecting the power distribution part, wherein the inner periphery of the cover is located more inside than the outermost periphery of the coil ends in the radial direction and has inclined parts inclined toward the coil ends.

According to the rotary electric machine for a vehicle of the invention, the inclined part that is inclined toward the coil end side is provided on the inner periphery of the cover for protecting the power distribution part of the stator so that the cooling oil discharged from the inner periphery of the rotor can be captured and guided into a valley between the coil ends, improving cooling performance between phases of the coil that tends to be heated.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
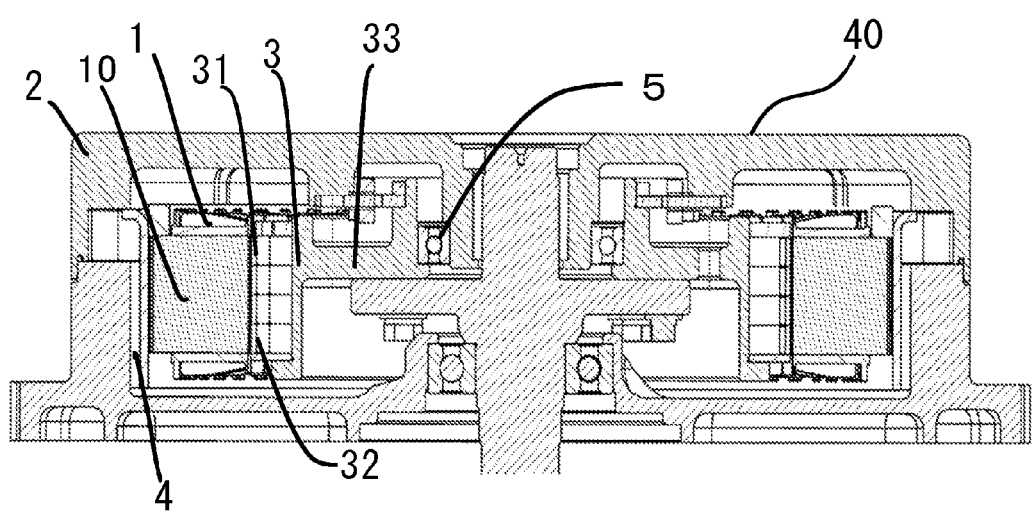
FIG. 1 is a cross-sectional view showing the structure of a rotary electric machine for a vehicle of the first embodiment of the invention.

A first embodiment of the invention is described below with reference to the drawings. FIG. 1 is a cross-sectional view showing the structure of a rotary electric machine for a vehicle of the first embodiment of the invention. As shown in FIG. 1, a rotary electric machine 40 for a vehicle includes a stator 1 and a rotor 3. On the outer periphery side of the rotor 3, a rotor core 31 formed of a laminated steel sheet is placed with a permanent magnet 32 placed therein. The rotor core 31 is fixed with the inner periphery press fit into the outer periphery of a rotor boss portion 33. The stator 1 is formed with a stator core 10 formed of a laminated steel sheet press fit into the inner periphery of a, ring-shaped frame 4. A predetermined gap is provided between the inner periphery of the stator core 10 and the outer periphery of the rotor core 31.

Further, the rotor 3 is held rotatably with respect to a housing 2 by a bearing 5 placed in the inner periphery of the rotor boss portion 33. The rotary electric machine 40 for a vehicle has a structure in which the stator 1 is powered via a harness from the outside to generate a rotating magnetic field, thereby rotary-driving the rotor 3 to transmit generated torque.

Figure 2:
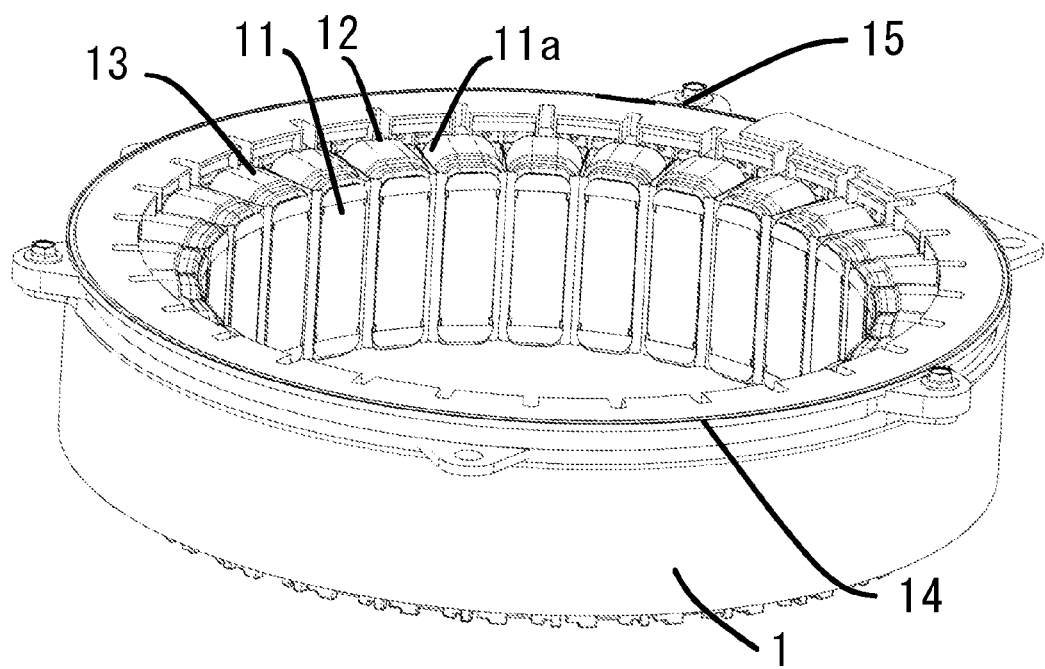
FIG. 2 is a perspective view showing the structure of the stator of the rotary electric machine for a vehicle of the first embodiment of the invention.

FIG. 2 is a perspective view showing the structure of the stator of the rotary electric machine for a vehicle of the first embodiment of the invention. As shown in FIG. 2, the stator 1 of the first embodiment has a winding part configured such that a plurality of split, cores 11 each with a coil 12 intensively wound thereon are arranged in a circle. With the split cores 11 arranged, slots 11a are formed surrounded by the plurality of split cores 11. The slot 11a is a space sandwiched by the adjacent split cores 11. Further, the stator 1 has coil ends 13 formed protruded toward the edge face of the split cores 11 and having a curved shape. The terminal wire of the coil 12 is joined to a power distribution part 14 placed on the radial outer periphery side of the split core 11 to achieve electrical connection between a bus bar 14a configured in the power distribution part 14 and the coil 12. Further, a power supply terminal protruded from one of the bus bars 14a can be energized from the outside to drive the rotary electric machine 40 for a vehicle. The power distribution part 14 includes a cover 15 for protecting the internal bus bars 14a.

Figure 3:
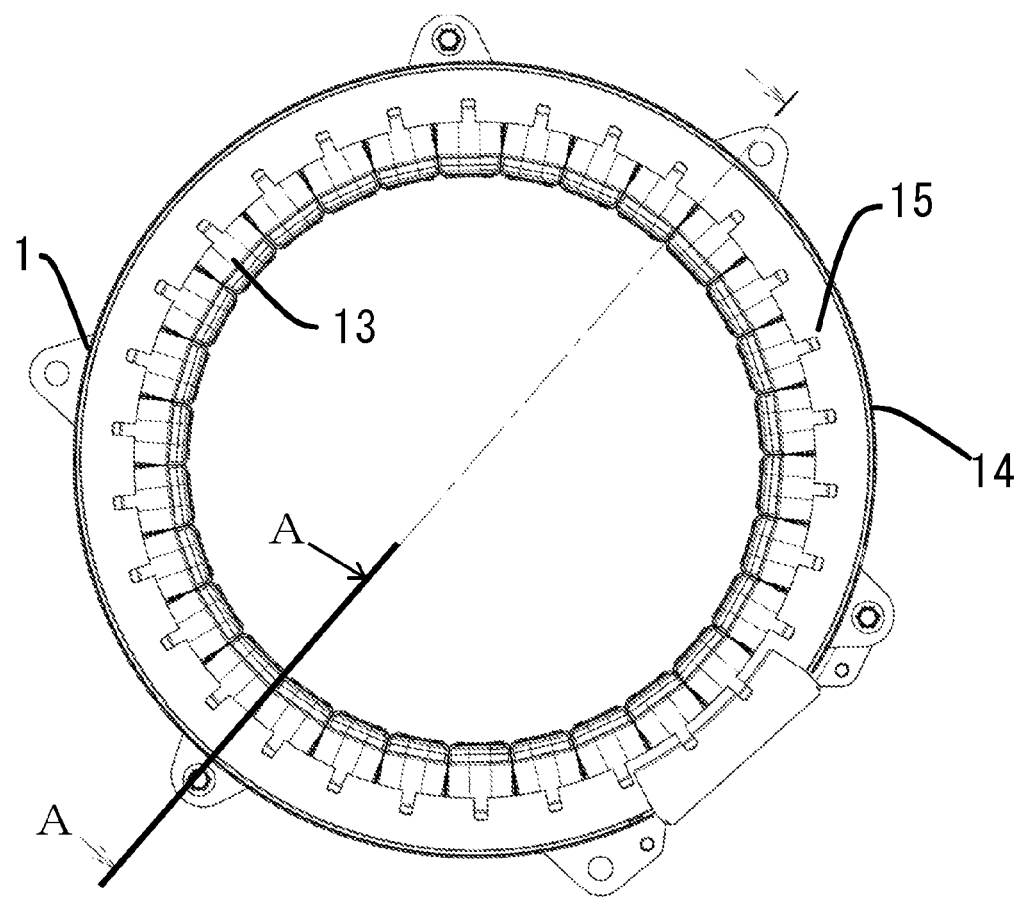
FIG. 3 is a top view showing the structure of the stator of the rotary electric machine for a vehicle of the first embodiment of the invention.

FIG. 3 is a top view showing the structure of the stator of the rotary electric machine for a vehicle of the first embodiment of the invention. As shown in FIG. 3, the inner periphery of the cover 15 placed on the power distribution part 14 is located more inside than the outermost periphery of the coil ends 13 in the radial direction.

Figure 4:
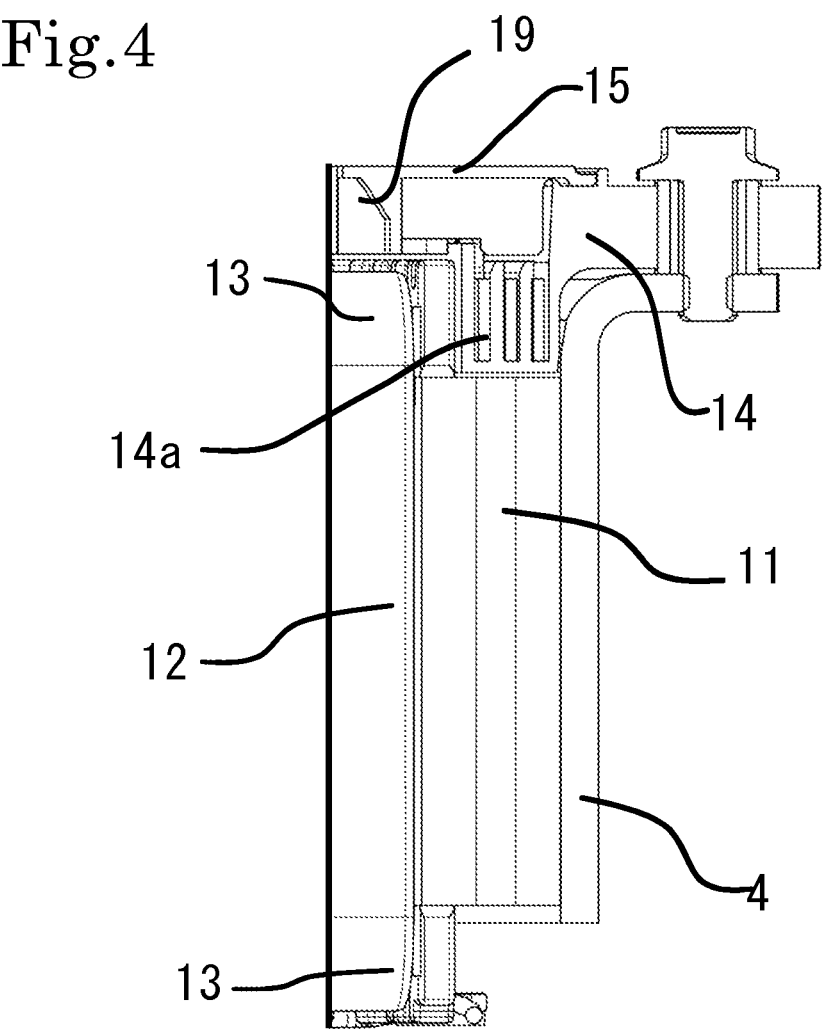
FIG. 4 is a cross-sectional view along the A-A line of the top view in FIG. 3.

FIG. 4 is a cross-sectional view showing the stator of the rotary electric machine for a vehicle of the first embodiment of the invention, and more particularly, cross-section along the AA line of the top view in FIG. 3. The split cores 11 each with the coil 12 wound thereon are arranged in a circle, then the power distribution part 14 is fixed and the terminals are welded, which completes the stator 1. In the power distribution part 14, the bus bars 14a for power distribution are placed each including the power supply terminal.

The power distribution part 14 includes the cover 15 for protecting the bus bars 14a with a predetermined distance from the bus bars 14a. The cover 15 includes a guide 19 formed at the edge of the inner periphery thereof, the guide 19 being inclined toward the coil end 13 side. The guide 19 with the inclined part is provided on the cover 15 at a position corresponding to between the adjacent split cores 11. Cooling oil splashed by the rotor 3 in the rotary electric machine 40 for a vehicle is captured by the guide 19 and discharged to the coil end 13. Particularly, the cooling oil captured by the guide 19 is intensively discharged to between the coils 12 of the phases between the split cores 11. This can improve cooling performance of the overall coils.

Figure 5:
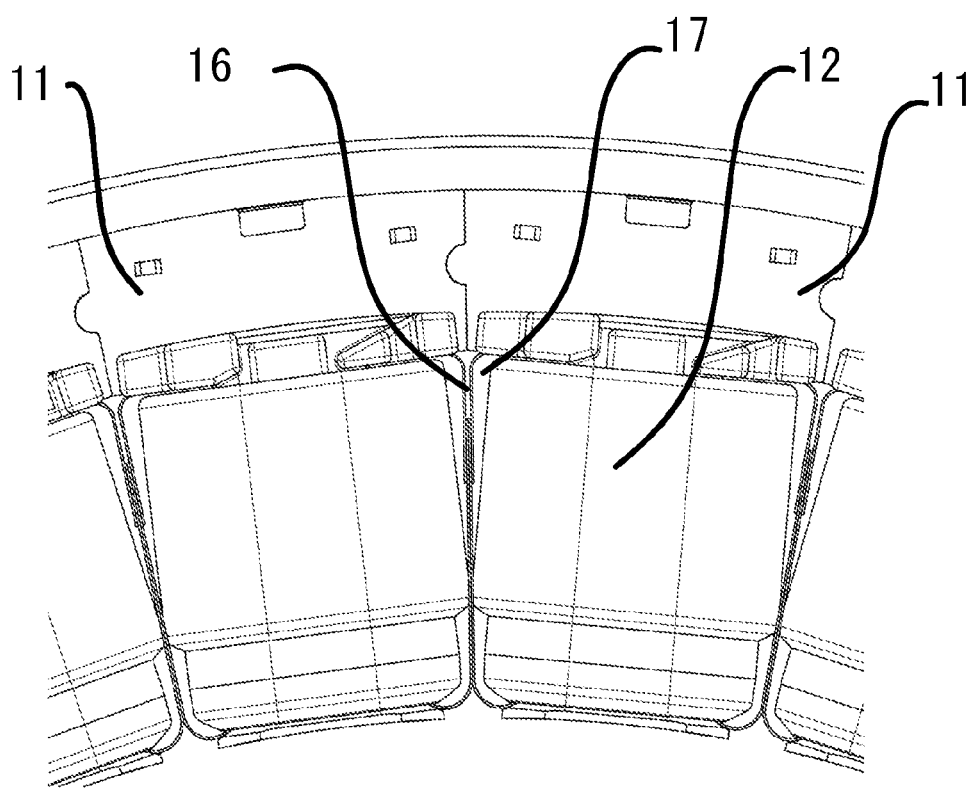
FIG. 5 is a top view showing the detail of the slot portion of the stator of the rotary electric machine for a vehicle of the first, embodiment of the invention.

FIG. 5 is a top view showing the detail of the slot portion of the stator of the rotary electric machine for a vehicle of the first embodiment of the invention. As shown in FIG. 5, the slot 11a between the adjacent split cores 11 has an opening 17. An insulating paper 16 is placed to cover the outer shape portion of the coil 12 of the individual split core 11. The insulating papers 16 are curved and engaged with each other near the fitting face between the split cores 11.

Figure 6:
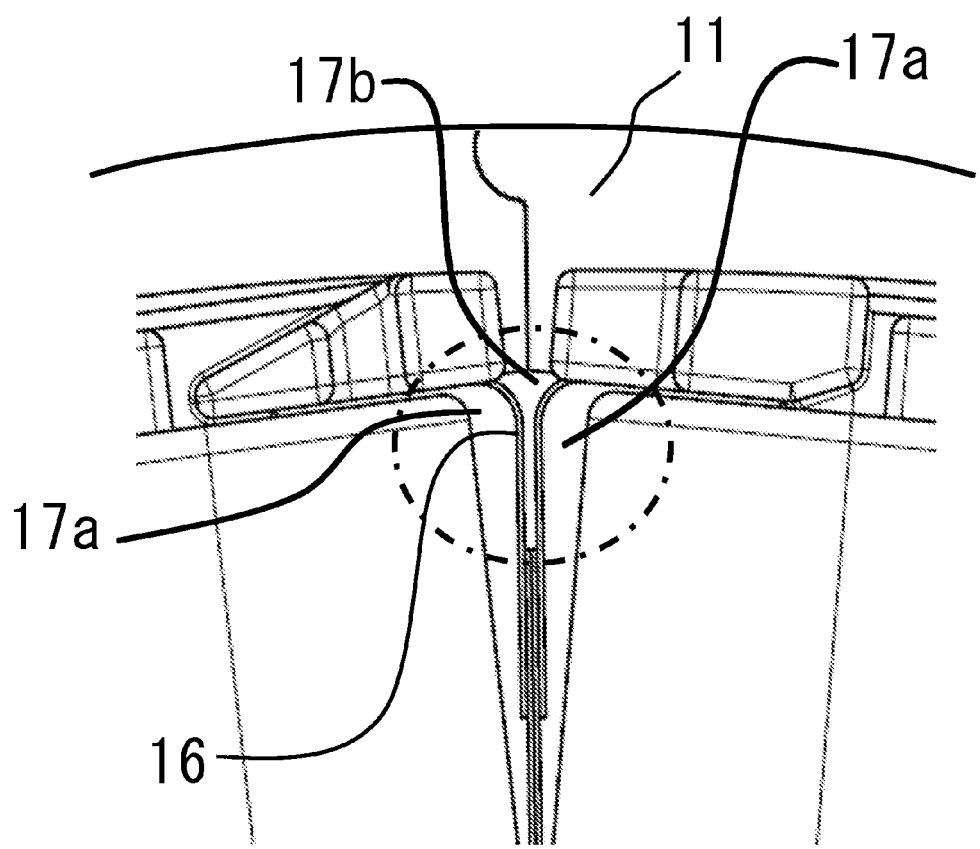
FIG. 6 is an enlarged view showing the detail of the slot portion of the stator of the rotary electric machine for a, vehicle of the first embodiment of the invention.

FIG. 6 is an enlarged view showing the detail of the slot portion of the stator of the rotary electric machine for a vehicle of the first embodiment of the invention. As shown in FIG. 6, the insulating papers 16 are curved with an R part toward the outer periphery of the slot 11a surrounded by the split cores 11. In FIG. 6, the two insulating papers 16 are inserted into the space surrounded by the split cores 11.

Furthermore, inserting the insulating papers 16 into the opening 17 forms two openings 17a surrounded by the outer shape portions of the two adjacent coils 12 and the insulating papers 16 in the slot 11a. Furthermore, the outermost periphery of the slot 11a and the insulating papers 16 form one opening 17b.

Thus, the guide 19 provided at the edge of the inner periphery of the cover 15 for protecting the power distribution part 14 divides and guides the captured cooling oil into the openings 17a, 17b. This structure can facilitate uniform cooling of the coil to prevent local temperature distribution from occurring in the coil. As a result, the heat life of the stator 1 can be increased. Furthermore, penetration of the oil into the insulating papers 16 can also improve the insulation performance of the insulating papers 16 themselves.

Figure 7:
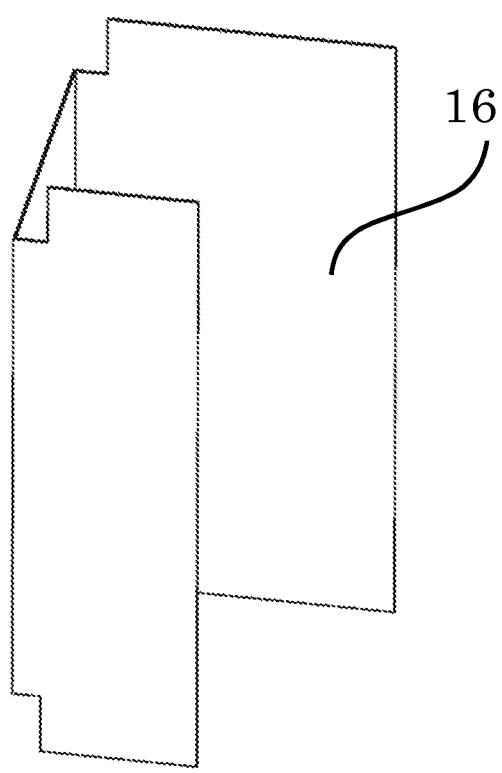
FIG. 7 is a perspective view showing the state before insertion into the slot of an insulating paper to be inserted into the rotary electric machine for a vehicle of the first embodiment of the invention.
Figure 8:
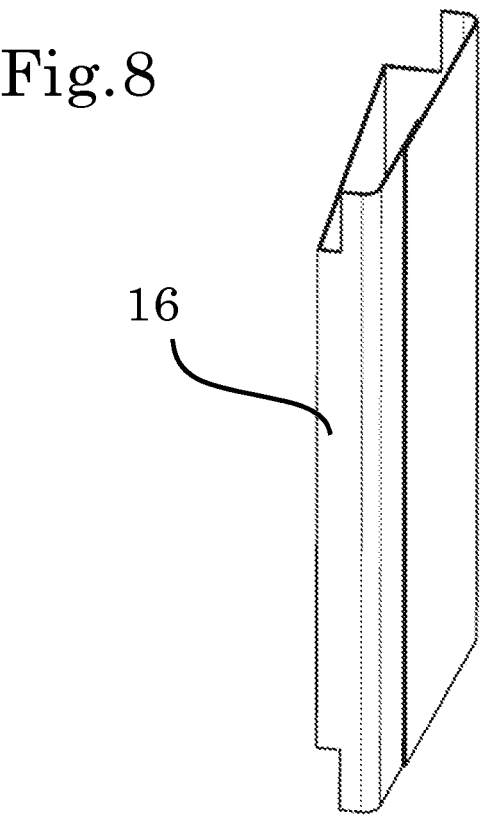
FIG. 8 is a perspective view showing the state after insertion into the slot of the insulating paper to be inserted into the rotary electric machine for a vehicle of the first embodiment of the invention.

FIG. 7 is a perspective view showing the state before insertion into the slot of an insulating paper to be inserted into the rotary electric machine for a vehicle of the first embodiment of the invention. On the other hand, FIG. 8 is a perspective view showing the state after insertion into the slot of the insulating paper to be inserted into the rotary electric machine for a vehicle of the first embodiment of the invention. In the enlarged view of the slot portion shown in FIG. 6, two of the insulating papers 16 in the state shown in FIG. 8 are inserted. The insulating paper 16 is formed of a thin film, such as polyphenylenesulfide resin.

Further, as shown in FIG. 6, in the opening 17b surrounded by the outermost periphery of the slot 11a configured by the split cores 11 and the insulating papers 16, the insulating papers 16 are curved toward the outer periphery. This structure causes the opening 17b to gradually expand toward the outer periphery of the slot 11a. This causes the discharged cooling oil to penetrate to the inside in the axis direction of the split core 11 heated by iron loss, which can suppress heat generation of the split core 11.

Figure 9:
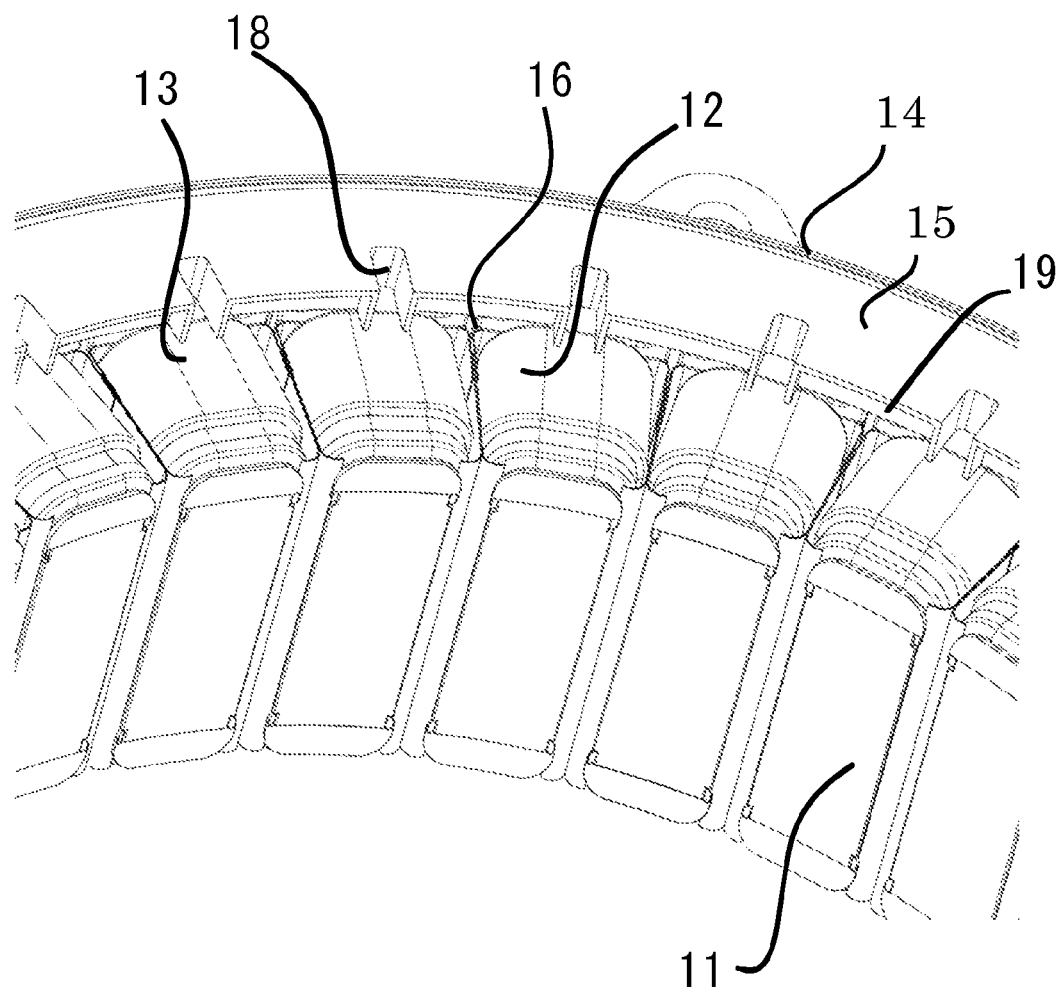
FIG. 9 is a perspective view showing the detail of the cover of the power distribution part of the stator of the rotary electric machine for a vehicle of the first embodiment of the invention.

FIG. 9 is a perspective view showing the detail of the cover of the power distribution part of the stator of the rotary electric machine for a vehicle of the first embodiment of the invention. As shown in FIG. 9, the cover 15 placed on the power distribution part 14 includes the guide 19 and a concave portion 18 in the inner periphery. The guide 19 is formed on the cover 15 at a position corresponding to between the adjacent split cores 11. The concave portion 18 is formed on the cover 15 at a position corresponding to near the top of the coil end 13. That is, near the top of the coil end 13, the cover 15 has the concave portion 18 and does not have the guide 19.

Due to this, on the top of the coil end 13, the cooling oil splashed by the rotor 3 is discharged toward a more outer periphery than the coil 12, enabling cooling of the bus bar 14a in the power distribution part 14 that generates high heat. Furthermore, since the cooling oil hits the power distribution part 14 and is splashed back, the coil end 13 can also be cooled from the outer periphery side, further improving the cooling effect.

As described above, according to the rotary electric machine for a vehicle of the first embodiment, the guide 19 that is the inclined part that is inclined toward the coil end 13 side is provided at the edge of the inner periphery of the cover 15 for protecting the power distribution part 14 of the stator 1, so the cooling oil discharged from the inside of the rotor 3 is captured and guided into between phases of the coils 12, which can improve cooling performance between phases of the coil that tends to be heated.

Furthermore, the opening 17 is divided into areas by the insulating papers 16 in the slot 11a to eliminate ununiformity of cooling due to rotation direction, providing more uniform cooling.

Furthermore, the opening 17 is provided in the slot 11a, so cooling oil having an insulating capability can be pooled on both sides in the circumferential direction of the insulating papers 16, which can improve the cooling performance of the coil and improve the insulation performance of coil films and the insulating papers.

Furthermore, according to the rotary electric machine for a vehicle of the first embodiment, the opening 17b has an area that gradually expands toward the outer periphery in the slot 11a, so, since the cooling oil is biased toward the outer periphery by centrifugal force, a more amount of the cooling oil can be guided into the opening 17b in the slot 11a. This causes the discharged cooling oil to penetrate to the inside in the axis direction of the split core 11 heated by iron loss, which can suppress heat generation of the split core 11, providing a significant cooling effect.

Furthermore, the concave portion is provided on the inner periphery of the cover 15 at a position corresponding to near the top of the coil end 13 of the stator 1, so the cooling oil discharged from the inner periphery is splashed from the coil end 13 to the outer periphery side to be scattered on the bus bar and the inside of the winding, enabling cooling of the inner layer part of the coil that is difficult to be cooled.

Various modifications and alterations of this invention will be apparent to those skilled in the art without departing from the scope and spirit of this invention, and it should be understood that this is not limited to the illustrative embodiments set forth herein.

What is claimed is:

1. A rotary electric machine for a vehicle comprising:
   a stator that is placed opposite the outer periphery face of a rotor and has a plurality of split cores;
   coil ends formed protruded toward the edge face in the axis direction of the cores on each of which a coil is wound;
   a power distribution part placed on the radial outer periphery side of the cores; and
   a cover for protecting the power distribution part,
   wherein the inner periphery of the cover is located more inside than the outermost periphery of the coil ends in the radial direction and has inclined parts inclined toward the coil ends.

2. The rotary electric machine for a vehicle according to claim 1, wherein the inclined part is provided at a position corresponding to between the adjacent cores.

3. The rotary electric machine for a vehicle according to claim 1, wherein a concave portion is provided on the inner periphery of the cover at a position corresponding to near the top of the coil end.

4. The rotary electric machine for a vehicle according to claim 1, further comprising:
   a slot provided surrounded by the adjacent cores; and
   insulating papers inserted into the slot to cover the side face of the coils and curved toward the outer periphery of the slot,
   wherein, between the adjacent cores, an opening is provided that is divided by the outermost periphery of the slot, the outer shape portion of the coils and the insulating papers.

5. The rotary electric machine for a vehicle according to claim 4, wherein the opening comprises:
   a first opening surrounded by the outer shape portion of the coils and the insulating papers; and
   a second opening surrounded by the outermost periphery of the slot and the insulating papers.

6. The rotary electric machine for a vehicle according to claim 5, wherein the second, opening gradually expands toward the outer periphery in the slot.

* * * * *